(12) United States Patent
Feigenbaum et al.

(10) Patent No.: US 6,216,161 B1
(45) Date of Patent: Apr. 10, 2001

(54) SYSTEM FOR DETERMINING WHETHER TO CONNECT A TERMINAL TO A SERVICE PROVIDER ACCORDING TO INFORMATION STORED IN AN INFORMATION PROVIDER FOR THE TERMINAL

(76) Inventors: Idan Feigenbaum; Yerach Feigenbaum, both of 3 Simtat Hatamarim, Kiryat Bialik (IL), 27043

( * ) Notice: Subject to any disclaimer, the term of this patent is extended or adjusted under 35 U.S.C. 154(b) by 0 days.

(21) Appl. No.: 09/152,862

(22) Filed: Sep. 14, 1998

(30) Foreign Application Priority Data

Sep. 15, 1997 (IL) ....................................................... 121776

(51) Int. Cl.[7] .......................... G06F 15/16; G06F 15/173; H04M 3/42; H04M 15/24
(52) U.S. Cl. ........................... 709/225; 709/227; 709/237; 379/215; 379/36
(58) Field of Search ..................................... 709/225, 227, 709/237; 379/215, 36, 114; 705/34; 370/281

(56) References Cited

U.S. PATENT DOCUMENTS

| 5,636,209 | * | 6/1997 | Perlman | 370/281 |
| 5,862,203 | * | 1/1999 | Wulkman et al. | 379/114 |
| 6,073,176 | * | 6/2000 | Baindur net al. | 709/227 |
| 6,128,601 | * | 10/2000 | Van Horne et al. | 705/34 |

OTHER PUBLICATIONS

Park, et al, "Dial–Up Internet Access Service system with Automatic Billing Mechanism", 03/1997, pages 148–151, IEEE.*

* cited by examiner

Primary Examiner—Le Hien Luu

(57) ABSTRACT

An information supply apparatus is provided which includes an Information Provider and a Service Provider at a remote location. Information, stored in the Information Provider, is supplied via a communication line with caller or user name identification and the Service Provider to a calling terminal located at a user location. A dialing device dials the Service Provider at the remote location. The information supply apparatus includes a control system at the remote location, which is programmed: (a) after a calling terminal dials the Service Provider but before an information-transfer connection is made via the communication line, to make a determination whether or not there is information stored in the Information Provider for the respective calling terminal; (b) if the determination is positive, to complete the information-transfer connection between the calling terminal and the Service Provider; and (c) if the determination is negative, to delay the completion of the information-transfer connection between the calling terminal and the Service Provider for a predetermined time interval sufficient to enable the calling terminal to disconnect the communication line before the information-transfer connection is completed.

16 Claims, 3 Drawing Sheets

SYSTEM FOR DETERMINING WHETHER TO CONNECT A TERMINAL TO A SERVICE PROVIDER ACCORDING TO INFORMATION STORED IN AN INFORMATION PROVIDER FOR THE TERMINAL

FIELD OF THE INVENTION

The present invention relates to apparatus, and also to methods, for controlling the transfer of information to user terminals in a communication network, and particularly for controlling the transfer to a calling terminal of information stored in an Information Provider at a remote location of the network via a Service Provider at the remote location.

BACKGROUND OF THE INVENTION

Various types of networks, particularly the Internet and private networking, are increasingly being used for supplying information from a remote location to user terminals located at different user locations. In such systems, the information, such as E-mail, news, voice, or the like, is provided by an Information Provider at the remote location via a Service Provider connected to the user terminals via a communication line, e.g., the telephone line. Each of the user terminals includes a dialing device for calling the Service Provider at the remote location; and the remote location includes a control system for controlling the transfer of information to the calling terminal via modems or any communication device in the user terminals at the remote locations.

In the present systems, an information-transfer connection is made in the communication line for every call made to the Service Provider whether or not there is information available at the remote location for the particular calling terminal. For example, if the information is e-mail, an information-transfer connection is made after the calling terminal dials the Service Provider even though the Service Provider informs the user that no information (e-mail) is to be provided the user. Thus, the communication line to the Service Provider remains connected, and the caller is charged, even if there is no available information for the calling terminal, thereby increasing the charges to the caller and adding to the load on the communication lines.

An object of the present invention is to provide apparatus, and also a method, for supplying information stored in an Information Provider at a remote location, which apparatus and method have advantages in the above respects.

According to one aspect of the present invention, there is provided an information supply apparatus for supplying information stored in an Information Provider at a remote location, via a communication line with caller or user name identification, and a Service Provider at the remote location, to a calling terminal located at a user location and having a dialing device for dialing the Service Provider at the remote location, comprising a control system at the remote location programmed: (a) after a calling terminal dials the Service Provider but before an information-transfer connection is made via the communication line, to make a determination whether or not there is information stored in the Information Provider for the respective calling terminal; (b) if the determination is positive, to complete the information-transfer connection between the calling terminal and the Service Provider; and (c) if the determination is negative, to delay the completion of the information-transfer connection between the calling terminal and the Service Provider for a predetermined time interval sufficient to enable the calling terminal to disconnect the communication line before the information-transfer connection is completed.

As used herein, the terms "germinal" and "client" are intended to include all types of telephones or other communication devices.

According to further features in the described preferred embodiments, the control system is programmed to make the determination by first checking whether or not there is stored therein the identification of the respective calling terminal, and if so, then checking whether or not there is stored therein information for the calling terminal.

More particularly, in the described preferred embodiments, the control system includes a data base storing the identifications of all the user terminals connectable via the communication line to the Service Provider; a status module indicating whether or not there is information stored for a respective calling terminal; and a control unit programmed first to check the data base, and then the status module, and to control the Service Provider in response thereto. The data base further includes a profile module for storing profiles of the type of information to be provided to the respective user terminals by the Service Provider.

The growing use of the caller ID in such information transfer systems allows the Service Provider to identify the calling terminal before making the information-transfer connection. Accordingly, the foregoing features of the present invention allow the apparatus to prevent the information-transfer connection when information is not available for a particular calling terminal, thereby saving the telephone costs as well as reducing the load on the communication line.

In information transfer systems not including the caller ID capability, the control system may be provided with a switch which, when a calling terminal dials the Service Provider, reads the identification of the calling terminal and transfers it to the control unit. In any case, the system could be connected through an "operator" which could provide the caller ID service or a similar user identification.

The invention also provides a method for supplying information in the cost-saving and load-reducing manner described above.

Further features and advantages of the invention will be apparent from the description below.

BRIEF DESCRIPTION OF THE DRAWINGS

The invention is herein described, by way of example only, with reference to the accompanying drawings, wherein.

DETAILED DESCRIPTION OF PREFERRED EMBODIMENTS

Figure 1:
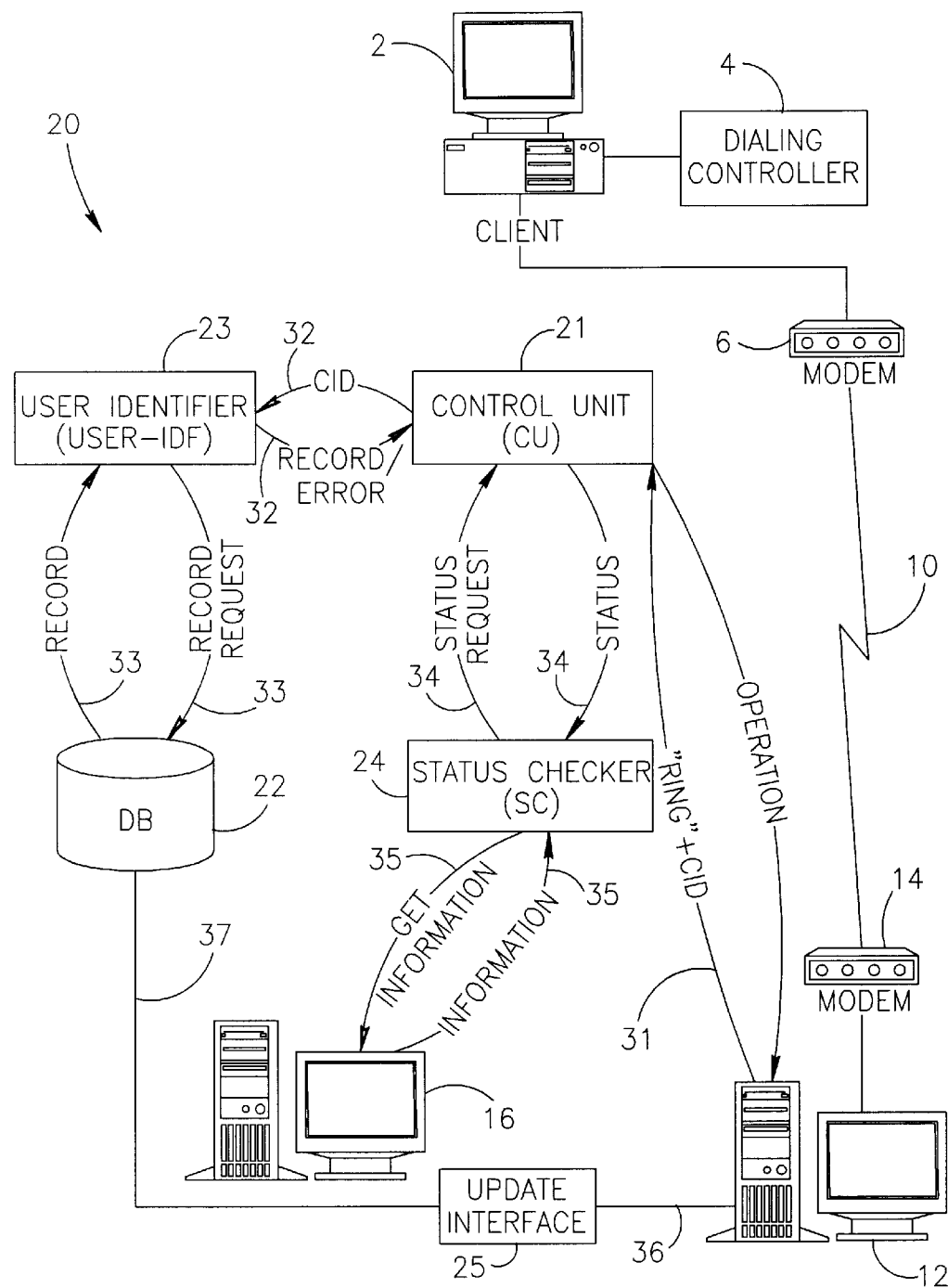
FIG. 1 is a block diagram illustrating one form of information supply apparatus constructed in accordance with the present invention, wherein the system includes the caller ID identification of the calling terminal.

The system illustrated in FIG. 1 is, as indicated above, one which uses the caller ID identifying to the Service Provider the calling terminal at the user location, As shown in FIG. 1, such a system includes a client terminal 2 at each user location, each including a dialing controller 4 for calling the Service Provider at the remote location via a modem 6 connected at the user location to the communication line 10.

The client terminal 2 at each user location may be, for example, a Personal Computer (PC), a Lap Top Computer, a work organizer, a windows CE device, a Personal Digital Assistant (PDA), or any telephone, the communication line 10 may be a wired communication line or a wireless communication line; and modem 6 may be an internal or external cable modem, wireless modem, ISDN modem, Radio Frequency (RF) modem, Infrared Radiation (IR) modem, etc. The remote location includes a Service Provider 12 connected via the communication line 10 by another modem 14 with a caller ID or user name support. Service Provider 12 provides information from an Information Provider 16, such as an E-mail server, a Voice-mail server, a News server, etc. Information Provider 16 may be incorporated in the Service Provider 12.

The Service Provider 12 and Information Provider 16 connection is controlled by a control system, generally designated 20, at the remote location. This control system includes a control unit 21, and a data base (DB) 22 storing the identifications of all the user terminals 2 connectable via the communication line 10 to the Service Provider 12. data base 22 communicates with control unit 21 via a user-identifier module 23 which identifies the user terminals in any suitable manner, e.g. by phone number, name, location, etc.

Data base 22 further includes a profile module for storing records of the profiles specifying the type of information to be provided to the respective user terminals 2 by the Service Provider 12. For example, the record to be stored in data base 22 for a particular client terminal 2 may include the E-mail account, a filter that the client wants on the mail (e.g., to receive only from selected senders), the news groups that client wants to check for news, etc.

Control system 20 at the remote location further includes: a status checker module 24, which indicates whether or not there is information stored for the respective user terminal 2; and an update interface module 25, which enables updating the data base 22 via the Service Provider 12.

It will be appreciated that the foregoing modules may be either hardware devices or software program units that perform their respective functions as described above.

The control unit 21 is connected to the Service Provider 12 by control line 31, and to the user identifier module 23 by control line 32. The user identifier module 23 is connected to the data base 22 by control line 33. Control unit 21 is further connected to the status checker module 24 by control line 34. The status checker module is connected to the Information Provider 16 by control line 35. The update interface module 25 is connected to the Service Provider 12 by control line 36, and to the data base 22 by control line 37.

Figure 3:
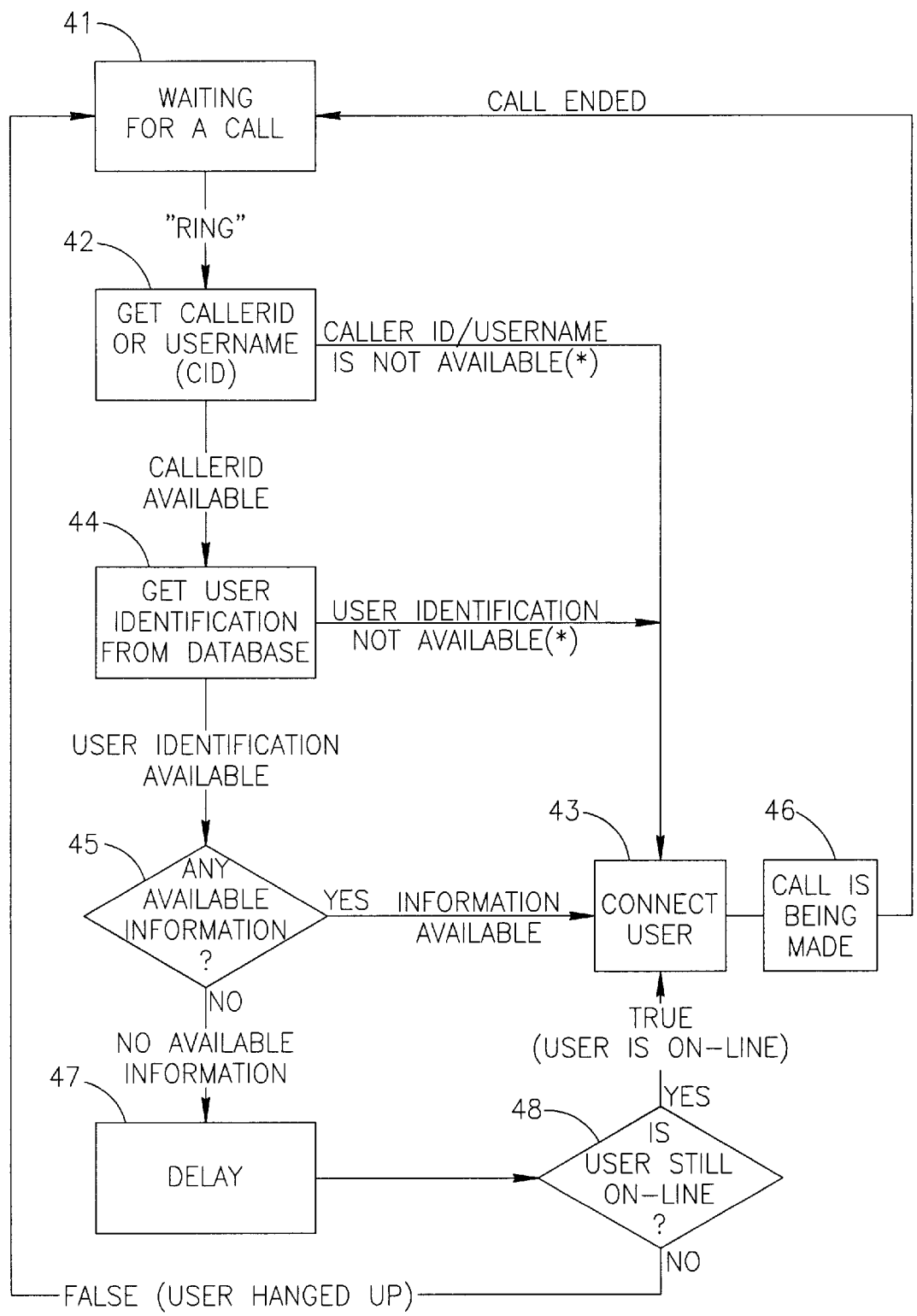
FIG. 3 is a flow chart illustrating the operation of the systems of FIGS. 1 and 2.

The operation of the apparatus illustrated in FIG. 1, as shown in the flow chart of FIG. 3, is as follows:

A transfer of information from the Information Provider 16 at the remote location to a client terminal 2 at the user location is initiated by operating the dialing controller 4 to call the Service Provider 12 via modems 6 and 14 at the opposite ends of the communication line 10. Before dialing, the Service Provider 12 is thus in a "waiting for a call" state (block 41, FIG. 3), and as soon as the dialing has been completed, it moves to a "ring" state. While it is in the "ring" state, and before the information-transfer connection is made, the Service Provider 12 reads the identification of calling terminal 2 via modems 6, 14 (block 42, FIG.3), and checks via control line 32, the user identifier module 23 of data base 22 to determine whether that particular user is identified in the data base. If not, the system will behave as in a conventional system, i.e., it will immediately complete the information-transfer connection (block 43).

If the identification of the calling terminal (caller ID) had been previously recorded in the data base, the caller identification (ID) is sent to the control unit 21 via control line 32 together with any profile record for that particular user previously recorded in the data base 22 via control line 33 (block 44). Such a record may be a profile of the type of information to be supplied to that particular client terminal, e.g. the E-mail account, any filter that the client wishes to apply to such mail, the news group that the client wishes to check for news, etc, The control unit 21 then checks, via control line 34, the status checker module 24 to see whether there is currently any information for the particular calling terminal. If there is such information for the calling terminal (block 45), the information-transfer connection is immediately made by the control unit 21 (block 43), whereupon the information in the Information Provider 16 is supplied to the user terminal 2 (block 46) via the Service Provider 12, modem 14, communication line 10, and modem 16.

If, on the other hand, no information is available to the calling terminal 2, the control unit 21 interposes a delay before making the information-transfer connection (block 47). This delay is for a predetermined time Interval sufficient to enable the calling terminal 2 to hang-up (block 48), and thus disconnect before the information-transfer connection is completed, thereby not only saving the cost of an unnecessary telephone call, but also reducing the load on the telephone line.

Figure 2:
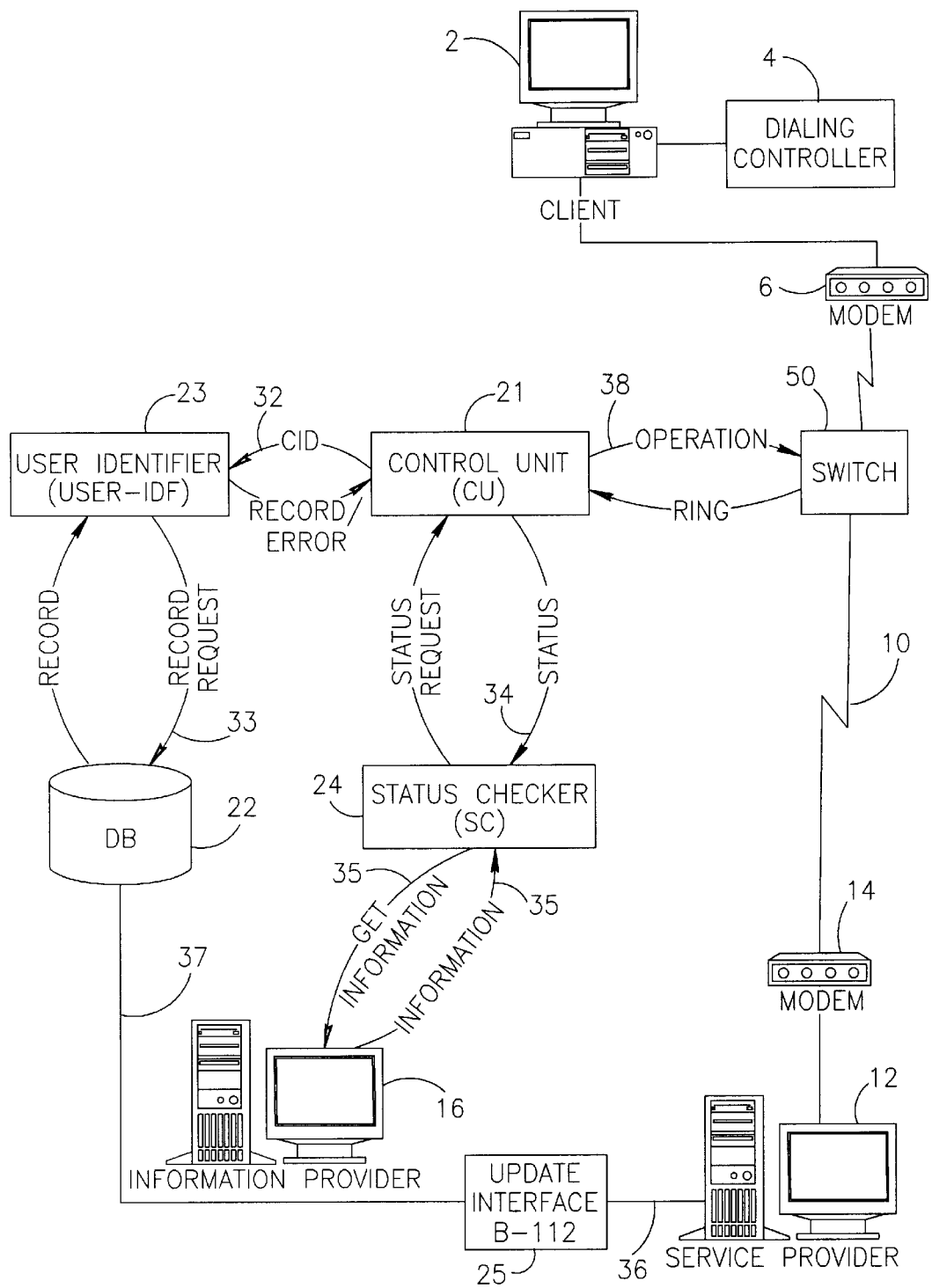
FIG. 2 is a block diagram of apparatus, similar to that of FIG. 1, but wherein the system does not include the caller ID.

The apparatus of FIG. 2 is similar to that of FIG. 1 but is modified so as to be applicable where the Service Provider or the Service Provider modem 14, of the system is not capable of reading the identification (ID) of the calling terminal. In such a case, the apparatus includes a switch, generally designated 50, at the remote location which reads the identification of the calling terminal, transfers it to the control unit, and controls the communication line via the control unit and control line 38. In all other respects, the apparatus illustrated in FIG. 2 is constructed, and operates in the same manner, as described above with respect to FIGS. 1 and 3, and therefore corresponding parts are identified by the same reference numerals in order to facilitate understanding.

While the invention has been described with respect to two preferred embodiments, it will be appreciated that these are set forth merely for purposes of example, and that many other variations, modifications and applications of the invention may be made. Rather the scope of the invention is defined by the claims which follow:

What is claimed is:

1. Information supply apparatus for supplying information stored in an Information Provider at a remote location, via a communication line with caller or user name identification, and a Service Provider at said remote location, to a calling terminal located at a user location and having a dialing device for dialing said Service Provider at said remote location, comprising a control system at said remote location programmed:

a) after a calling terminal dials the Service Provider but before an information-transfer connection is made via the communication line, to make a determination whether or not there is information stored in said Information Provider for the respective calling terminal;

b) if said determination is positive, to complete said information-transfer connection between the calling terminal and the Service Provider; and c) if said determination is negative, to delay the completion of said information-transfer connection between the calling terminal and the Service Provider for a predetermined time interval sufficient to enable the calling terminal to disconnect the communication line before the information-transfer connection is completed.

2. The apparatus according to claim 1, wherein said control system is programmed to make said determination by first checking whether or not there is stored therein the identification of the respective calling terminal, and if so, then checking whether or not there is stored therein information for the calling terminal.

3. The apparatus according to claim 1, wherein said control system includes: a data base storing the identifications of all the user terminals connectable via said communication line to said Service Provider; a status module indicating whether or not there is information stored for a respective calling terminal; and a control unit programmed first to check said data base, and then said status module, and to control said Service Provider in response thereto.

4. The apparatus according to claim 3, wherein said control system further includes a profile module for storing profiles of the type of information to be provided to the respective user terminals by said Service Provider.

5. The apparatus according to claim 3, wherein said control system further includes a switch which, when a calling terminal dials the Service Provider, reads the identification of the calling terminal and transfers it to the control unit.

6. The apparatus according to claim 1, wherein said control system further includes an updating interface module which enables updating the data base by the Service Provider.

7. The apparatus according to claim 1, wherein each of said user terminals includes a modem at the respective user location, and said control system includes a modem at said remote location.

8. Information supply apparatus, comprising:
   a) a plurality of user terminals each at a user location;
   b) an Information Provider at a remote location;
   c) a Service Provider at said remote location;
   d) a communication line connecting said Service Provider at said remote location to each of said user terminals at said user location for supplying said user terminals with information from said Information Provider;
   e) each of said user terminals including a dialing device for calling said Service Provider at said remote location; and
   f) a control system at said remote location for controlling the transfer of information from said Service Provider to a calling terminal; said control system being programmed:
      i) after a calling terminal dials the Service Provider but before an information-transfer connection is made via the communication line, to make a determination whether or not there is information stored in said Information Provider for the respective calling terminal;
      ii) if said determination is positive, to complete said information-transfer connection between the calling terminal and the Service Provider; and
      iii) if said determination is negative, to delay the completion of said information-transfer connection between the calling terminal and the Service Provider for a predetermined time interval sufficient to enable the calling terminal to disconnect the communication line before the information-transfer connection is completed.

9. The apparatus according to claim 8, wherein said control system is programmed to make said determination by first checking whether or not there is stored therein the identification of the respective calling terminal, and if so, then checking whether or not there is stored therein information for the calling terminal.

10. The apparatus according to claim 8, wherein said control system includes: a data base storing the identifications of all the user terminals connectable via said communication line to said Service Provider, a status module indicating whether or not there is information stored for a respective calling terminal; and a control unit programmed first to check said data base, and then said status module, and to control said Service Provider in response thereto.

11. The apparatus according to claim 10, wherein said control system further includes a profile module for storing profiles of the type of information to be provided to the respective user terminals by said Service Provider.

12. The apparatus according to claim 10, wherein said control system further includes a switch which, when a calling terminal dials the Service Provider, reads the identification of the calling terminal and transfers it to the control unit.

13. The apparatus according to claim 8, wherein said control system further includes an updating interface module Which enables updating the data base by the Service Provider.

14. The apparatus according to claim 8, wherein each of said user terminals includes a modem at the respective user location, and said control system includes a modem at said remote location.

15. A method for supplying information stored in an Information Provider at a remote location, via a communication line and a Service Provider at said remote location, to a calling user terminal located at a user, location and having a dialing device for dialing said Service Provider at said remote location, comprising programming a control system at said remote location to perform the following operations:
   (a) after a calling terminal dials the Service Provider but before an information-transfer connection is made via the communication line, to make a determination whether or not there is information stored in said Information Provider for the respective calling terminal;
   (b) if said determination is positive, to complete said information-transfer connection between the calling terminal and the Service Provider; and
   (c) if said determination is negative, to delay the completion of said information-transfer connection between the calling terminal and the Service Provider for a predetermined time interval sufficient to enable the calling terminal to disconnect the communication line before the information-transfer connection is completed.

16. The method according to claim 15, wherein said control system is programmed to make said determination by first checking whether or not there is stored therein the identification of the respective calling terminal; and if so, then checking whether or not there is stored therein information for the calling terminal.

* * * * *